United States Patent
Chen

(10) Patent No.: US 9,634,563 B2
(45) Date of Patent: Apr. 25, 2017

(54) RAMP SIGNAL GENERATING METHOD AND GENERATOR THEREOF, AND PULSE WIDTH MODULATION SIGNAL GENERATOR

(71) Applicant: uPI Semiconductor Corp., Hsinchu County (TW)

(72) Inventor: Ya-Ping Chen, Hsinchi County (TW)

(73) Assignee: uPI Semiconductor Corp., Hsinchu County (TW)

( * ) Notice: Subject to any disclaimer, the term of this patent is extended or adjusted under 35 U.S.C. 154(b) by 189 days.

(21) Appl. No.: 14/264,066

(22) Filed: Apr. 29, 2014

(65) Prior Publication Data

US 2015/0077083 A1 Mar. 19, 2015

(30) Foreign Application Priority Data

Sep. 17, 2013 (TW) .............................. 102133718 A

(51) Int. Cl.
*G05F 1/00* (2006.01)
*H02M 3/156* (2006.01)

(52) U.S. Cl.
CPC .... *H02M 3/156* (2013.01); *H02M 2003/1566* (2013.01)

(58) Field of Classification Search
CPC .. H02M 3/156; H02M 3/1588; H02M 3/1584; H02M 3/158; H02M 3/157; H02M 3/33507; H02M 3/1563
USPC ................................................ 323/282–288
See application file for complete search history.

(56) References Cited

U.S. PATENT DOCUMENTS

| | | | |
|---|---|---|---|
| 5,666,385 A * | 9/1997 | Sullivan | H03K 7/08 332/107 |
| 7,023,253 B2 | 4/2006 | Huang et al. | |
| 7,728,573 B2 | 6/2010 | Capilla et al. | |
| 7,868,600 B2 | 1/2011 | Qiu et al. | |
| 8,085,562 B2 * | 12/2011 | Sisson | G05F 1/70 323/207 |
| 2004/0201516 A1* | 10/2004 | Lyon | G01S 7/4008 342/124 |

(Continued)

FOREIGN PATENT DOCUMENTS

| | | |
|---|---|---|
| CN | 101036094 | 9/2007 |
| TW | 201317734 | 5/2013 |

(Continued)

OTHER PUBLICATIONS

"Office Action of Taiwan Counterpart Application," issued on Feb. 25, 2015, p. 1-p. 5.

*Primary Examiner* — Jue Zhang
*Assistant Examiner* — Kevin H Sprenger
(74) *Attorney, Agent, or Firm* — Jianq Chyun IP Office

(57) ABSTRACT

A ramp signal generating method and a generator thereof, and a pulse width modulation signal generator are provided. The ramp signal generating method includes following steps: receiving an error signal, wherein the error signal relates to an output voltage of a power converter; generating an error delayed signal according to the error signal; and providing a ramp signal according to the error signal and the error delayed signal. The ramp signal is phase leading and inverting compared to the error signal. The ramp signal serves to improve a response speed of the power converter.

4 Claims, 7 Drawing Sheets

(56) References Cited

U.S. PATENT DOCUMENTS

| | | | |
|---|---|---|---|
| 2005/0068084 A1* | 3/2005 | Yeh | H03K 3/013 327/337 |
| 2006/0091872 A1* | 5/2006 | Matsuura | H02M 3/156 323/283 |
| 2009/0231889 A1* | 9/2009 | Saint-Pierre | H02M 1/4208 363/44 |
| 2011/0095731 A1 | 4/2011 | Zhao et al. | |
| 2012/0032661 A1* | 2/2012 | Nakamura | H02M 3/156 323/288 |

FOREIGN PATENT DOCUMENTS

| | | |
|---|---|---|
| TW | 201328148 | 7/2013 |
| WO | 2005057767 | 6/2005 |

\* cited by examiner

RAMP SIGNAL GENERATING METHOD AND GENERATOR THEREOF, AND PULSE WIDTH MODULATION SIGNAL GENERATOR

CROSS-REFERENCE TO RELATED APPLICATION

This application claims the priority benefit of Taiwan application serial no. 102133718, filed on Sep. 17, 2013. The entirety of the above-mentioned patent application is hereby incorporated by reference herein and made a part of this specification.

BACKGROUND

Technical Field

The invention relates to a power conversion technique. Particularly, the invention relates to a ramp signal generating method and a generator thereof applied to a power converter, and a pulse width modulation signal generator.

Related Art

FIG. 1 is a schematic diagram of a conventional power converter. FIG. 2 is a waveform diagram of the conventional power converter. Referring to FIG. 1 and FIG. 2, the conventional power converter 100 generally adopts a constant on time architecture. A ramp generator 140 generates a ramp signal Xramp having a constant triangular wave. A comparator 110 compares an error signal Xerr with the ramp signal Xramp to generate a comparison signal Xcm. A time control circuit 120 generates a pulse width modulation (PWM) signal Xpwm according to the comparison signal Xcm, an input voltage Vin and an output voltage Vout. A width of an on time Ton of each period of the PWM signal Xpwm is a constant value, and the width of the on time Ton relates to the input voltage Vin and the output voltage Vout.

In the power converter 100, the comparison signal Xcm is generated according to the error signal Xerr and the ramp signal Xramp. The time control circuit 120 determines the on time Ton for outputting the PWM signal Xpwm according to the comparison signal Xcm. An amplitude of the error signal Xerr relates to a feedback signal Vfb and a reference voltage Vref. At a moment for deciding the on time Ton for outputting the PWM signal Xpwm, the time control circuit 120 starts to calculate and generate the on time Ton, and the on time Ton of each period of the PWM signal Xpwm is constant.

Although the conventional operation architecture of pulse width modulation may achieve an effect of fixed frequency, when an equivalent series resistance ESR of a capacitor CL and an equivalent series resistance DCR of an inductor L on an output terminal of the power converter 100 are all very small, the energy compensated by the capacitor CL and the inductor L in response to a load transient variation is delayed, so that the feedback signal Vfb and the error signal Xerr are also delayed. The original error signal Xerr generated by the compensation circuit 130 cannot be used to converge the output voltage Vout. Moreover, since the ramp signal Xramp has a waveform with a fixed discharge slope, the discharge slope cannot be changed along with the load transient variation. The above reasons lead to unstable oscillation of the power converter 100.

FIG. 3 is a circuit diagram of the conventional ramp generator. Referring to FIG. 1 and FIG. 3, in the ramp generator 140, a current source IRamp, N-type metal oxide semiconductor (MOS) transistors MN1 and MN2 construct a current mirror. A first clamping voltage Vclamp1 is greater than a second clamping voltage Vclamp2. When the error signal Xerr is greater than the ramp signal Xramp, a reset signal RST turns on a switch S1, and a voltage of a capacitor Cramp is charged to the first clamping voltage Vclamp1. Then, the current mirror discharges to the capacitor Cramp. A current value of the current source IRamp (a discharge current) is fixed. When the ramp signal Xramp is discharged to the second clamping voltage Vclamp2, the ramp signal Xramp is clamped to the second clamping voltage Vclamp2. The ramp generator 140 provides the ramp signal Xramp having a constant waveform through the aforementioned charging and discharging operations to serve as an adjustment reference for comparing with the error signal Xerr.

FIG. 4 is another waveform diagram of the conventional power converter. Referring to FIG. 1 and FIG. 4, related waveforms of FIG. 4 are obtained when the power converter 100 adopts the constant on time architecture and is operated in a discontinuous conduction mode (DCM). When an output load current Iload belongs to a very light load, an operation frequency of an inductor current IL is decreased (i.e. a time of the operation period is prolonged), such that the ramp signal Xramp having the fixed discharge slope is discharged to a level of the lowest clamp voltage. When the output voltage Vout has insufficient energy and requires energy, the waveform of the error signal Xerr climbs up, and an angle θ formed between the climbed error signal Xerr and the approximately horizontal ramp signal Xramp is decreased. The angle θ relates to anti-noise capability. When the angle θ is decreased, the anti-noise capability of the power converter 100 is decreased, and severe jitter is probably generated.

SUMMARY

The invention is directed to a ramp signal generating method and a generator thereof, and a pulse width modulation (PWM) signal generator, which are used for resolving the problem mentioned in the related art.

The invention provides a ramp signal generator. The ramp signal generator is adapted to a power converter. The ramp signal generator includes an input unit, a delay unit and a conversion control device. The input unit receives an error signal. The error signal relates to an output voltage of the power converter. The delay unit is coupled to the input unit, and generates an error delay signal according to the error signal. The conversion control device is coupled to the input unit and the delay unit, and provides a ramp signal according to the error signal and the error delay signal.

In an embodiment of the invention, the conversion control device receives a difference between the error signal and the error delay signal, and provides the ramp signal according to the difference.

In an embodiment of the invention, the conversion control device has a K-multiple amplification coefficient, and the conversion control device receives a difference of the error signal and the error delay signal, and multiplies the difference by the K-multiple amplification coefficient to provide the ramp signal.

In an embodiment of the invention, the delay unit includes a resistor and a capacitor. The resistor is coupled to the input unit and the conversion control device, and the capacitor is coupled to the resistor and the conversion control device.

In an embodiment of the invention, the ramp signal is phase leading and inverting compared to the error signal.

The invention provides a pulse width modulation (PWM) signal generator, which is adapted to a power converter. The PWM signal generator includes an error amplifier, a ramp signal generator, a comparator and a control circuit. The error amplifier receives a feedback signal to generate an error signal. The ramp signal generator is coupled to the error amplifier, and receives the error signal to generate an error delay signal. The ramp signal generator provides a ramp signal according to the error signal, the error delay signal and a reference signal. The comparator is coupled to the error amplifier and the ramp signal generator, and generates a trigger signal according to the ramp signal and the error signal. The control circuit generates a PWM signal according to the trigger signal.

The invention provides a ramp signal generating method, which is adapted to a power converter. The ramp signal generating method includes following steps. An error signal is received, where the error signal relates to an output voltage of the power converter. An error delay signal is generated according to the error signal. A ramp signal is provided according to the error signal and the error delay signal.

In an embodiment of the invention, the step of providing the ramp signal according to the error signal and the error delay signal includes providing the ramp signal according to a difference between the error signal and the error delay signal.

In an embodiment of the invention, the step of providing the ramp signal according to the difference further includes providing the ramp signal by multiplying the difference by a K-multiple amplification coefficient.

According to the above descriptions, in the ramp signal generating method and the generator thereof and the PWM signal generator of the invention, the ramp signal is provided by using the error signal and the error delay signal. The novel ramp signal is used for replacing the conventional ramp signal. The ramp signal is phase leading and inverting compared to the error signal. In case of a loop control, the ramp signal and the error signal are used to decide a time point of the on time, so as to quickly converge the output voltage of the power converter, such that the output voltage is quickly returned to a stable state and a transient response speed is increased. Moreover, the architecture of the invention provides better anti-noise capability in a discontinuous conduction mode (DCM).

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
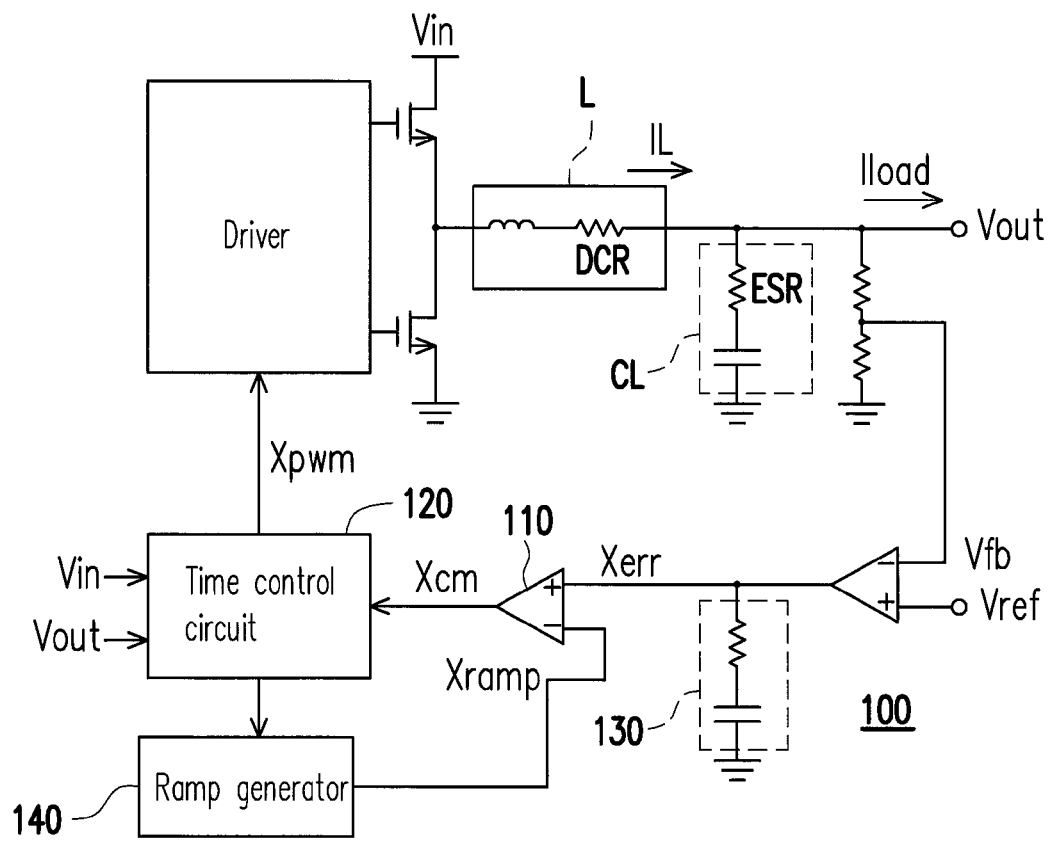
FIG. 1 is a schematic diagram of a conventional power converter.

Reference will now be made in detail to the present preferred embodiments of the invention, examples of which are illustrated in the accompanying drawings. Wherever possible, the same reference numbers are used in the drawings and the description to refer to the same or like parts.

In the following embodiments, when a device is described to be "connected" or "coupled" to another device, it is interpreted as that the device is directly connected to or coupled to the other device, or the device is indirectly connected to or coupled to the other device through other devices or connection means. A term "circuit" or "unit" represents at least one device or a plurality of devices, or devices actively and/or passively coupled to each other to provide a suitable function. A term "signal" represents at least one current, voltage, load, temperature, data or other signal. A ramp signal can also be a resemble ramp signal, a triangular wave signal or a sawtooth signal, which may have a repeat-descending type ramp or a repeat-rising type ramp, which is determined according to an actual application.

Figure 5:
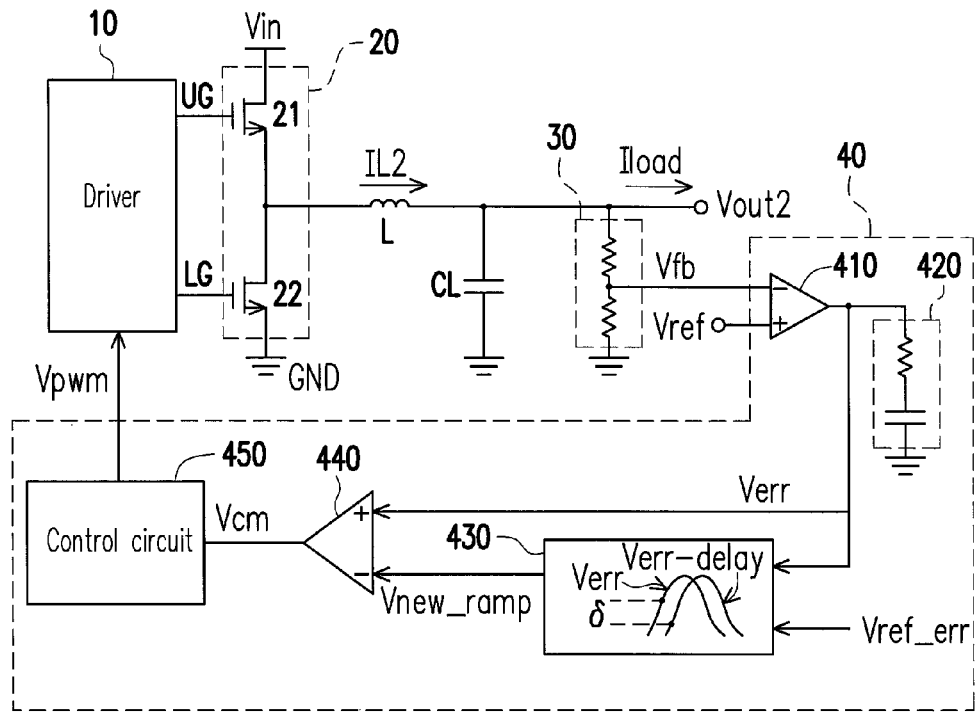
FIG. 5 is a structural schematic diagram of a power converter according to an embodiment of the invention.

FIG. 5 is a structural schematic diagram of a power converter according to an embodiment of the invention. Referring to FIG. 5, the power converter 500 includes a driver 10, an output stage 20, an inductor L, a capacitor CL, a feedback circuit 30 and a pulse width modulation (PWM) signal generator 40. A first terminal of a high side switch 21 in the output stage 20 receives an input voltage Vin. A low side switch 22 is coupled between a second terminal of the high side switch 21 and ground terminal GND.

In an embodiment of the invention, the PWM signal generator 40 and the driver 10 may construct a direct current (DC)-DC controller, or the PWM signal generator 40 may directly serve as the DC-DC controller. Moreover, the PWM signal generator 40, the driver 10 and the output stage 20 may construct a DC-DC converter. In addition, when the DC-DC controller or the DC-DC converter is implemented in an integrated circuit, a compensation circuit 420 in the PWM signal generator 40 can be configured at external of the aforementioned integrated circuit.

The PWM signal generator 40 includes an error amplifier 410, a ramp signal generator 430, a comparator 440 and a control circuit 450. The PWM signal generator 40 may further includes a compensation circuit 420. The error amplifier 410 receives a feedback signal Vfb and a reference signal Vref to generate an error signal Verr. The ramp signal generator 430 receives and delays the error signal Verr to generate an error delay signal Verr_delay, and generates a ramp signal Vnew_ramp according to a difference δ between the error signal Verr and the error delay signal Verr_delay and a reference signal Vref_err. The comparator 440 generates a trigger signal Vcm according to the ramp signal Vnew_ramp and the error signal Verr.

The feedback signal Vfb relates to an output voltage Vout2 of the power converter 500. In other embodiments, the feedback signal Vfb can be directly the output voltage Vout2. The control circuit 450 generates a PWM signal Vpwm according to the trigger signal Vcm to control the power converter 500. In an embodiment of the invention, the PWM signal Vpwm can be a constant on time (COT) signal. In other embodiment, the PWM signal Vpwm can be other types of signals, for example, a constant off time signal, which is not limited by the invention.

It should be noticed that in the present embodiment, the ramp signal Vnew_ramp is phase leading and inverting compared to the error signal Verr.

The driver 10 generates a high side switch control signal UG and a low side witch control signal LG according to the PWM signal Vpwm, so as to respectively control to high side switch 21 and the low side switch 22. The output stage 20 is used for performing DC-DC conversion on the input voltage Vin, such that the power converter 500 can produce the output voltage Vout2 and output the output voltage Vout2 to a load.

Figure 6:
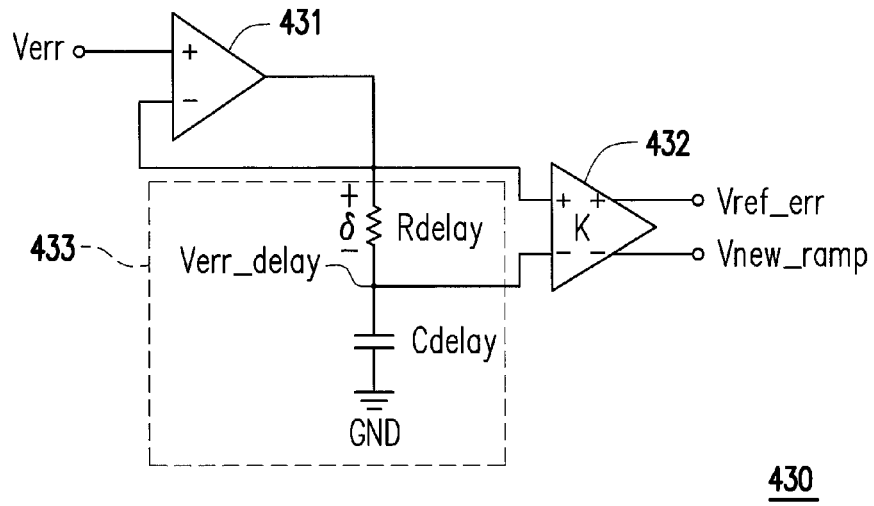
FIG. 6 is a circuit schematic diagram of a ramp signal generator according to an embodiment of the invention.
Figure 7:
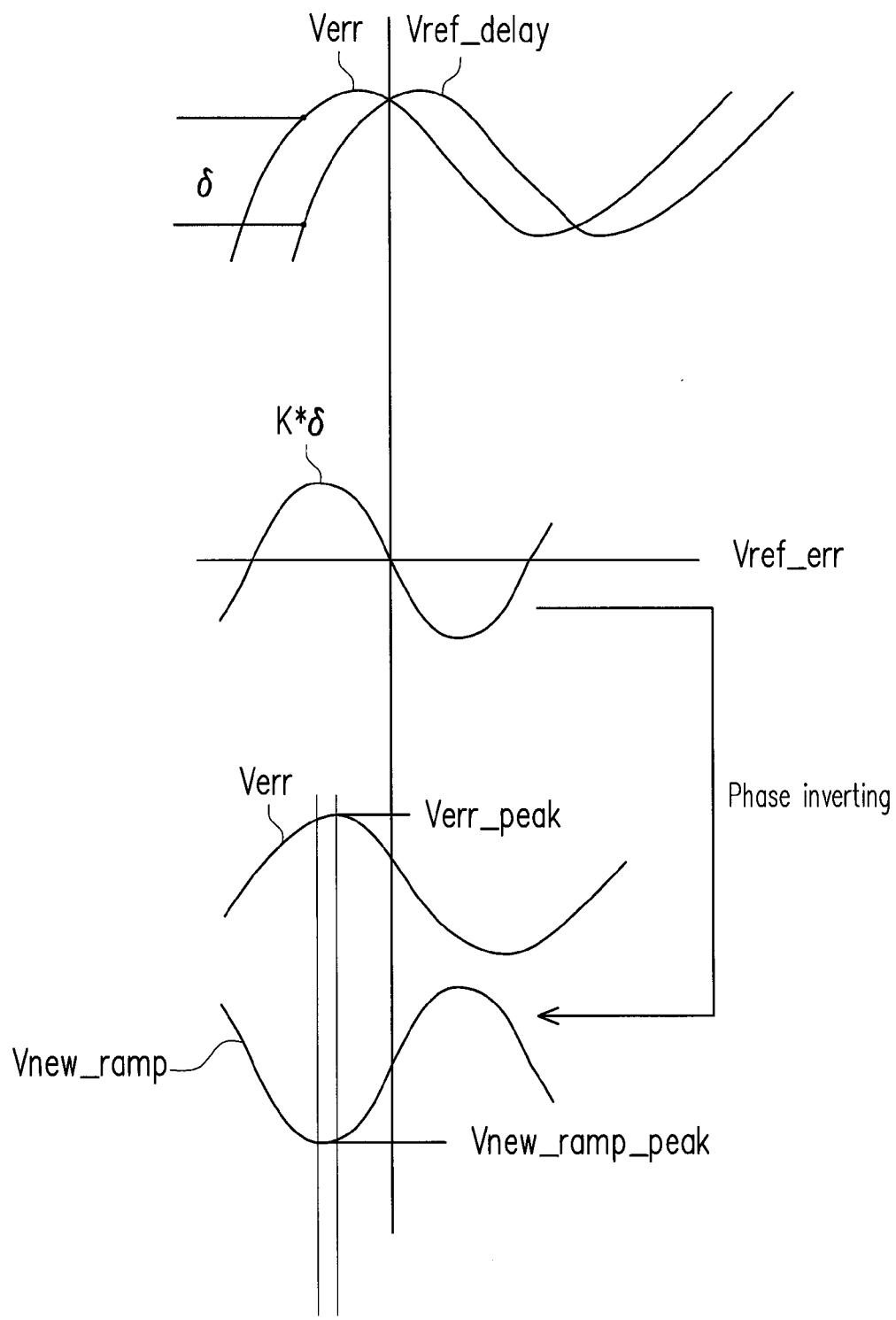
FIG. 7 is a waveform diagram of the ramp signal generator according to an embodiment of the invention.

FIG. 6 is a circuit schematic diagram of a ramp signal generator according to an embodiment of the invention. FIG. 7 is a waveform diagram of the ramp signal generator according to an embodiment of the invention. Referring to FIG. 5, FIG. 6 and FIG. 7, the ramp signal generator 430 includes an amplifier 431, a conversion control device 432 and a delay unit 433. The delay unit 433 includes a resistor Rdelay and a capacitor Cdelay. A first input terminal of the amplifier 431 receives the error signal Verr. The error signal Verr relates to the output voltage Vout2 of the power converter 500. A first terminal of the resistor Rdelay is coupled to a second input terminal and an output terminal of the amplifier 431. The capacitor Cdelay is coupled between a second terminal of the resistor Rdelay and the ground terminal GND. A first input terminal of the conversion control device 432 is coupled to the first terminal of the resistor Rdelay. A second input terminal of the conversion control device 432 is coupled to the second terminal of the resistor Rdelay. A third input terminal of the conversion control device 432 receives the reference signal Vref_err. An output terminal of the conversion control device 432 outputs the ramp signal Vnew_ramp.

In the present embodiment, the difference δ can be generated through a connection method of the amplifier 431, the capacitor Cdelay and the resistor Rdelay, where δ=Verr−Verr_delay. The conversion control device 432 can be a voltage-controlled voltage source (VCVS) device. The conversion control device 432 multiplies the difference δ received through the input terminal thereof by a K-multiple amplification coefficient (K is greater than 1) to amplify the difference. Moreover, if a value of the K-multiple amplification coefficient is between 0 and 1, the difference can be decreased. The conversion control device 432 performs an adding operation or an inverting operation according to the amplified difference (K*δ) and the reference signal Vref_err to provide the ramp signal Vnew_ramp. However, the invention is not limited to generate the ramp signal Vnew_ramp by using the difference δ, and in other embodiments, the ramp signal Vnew_ramp can be provided according to a circuit design or by using different operation methods between the error signal Verr and the error delay signal Verr_delay, which is not limited by the invention.

Moreover, a sequence of the inverting operation and the adding operation is not limited to the above embodiment. In another embodiment, the conversion control device 432 may first perform the inverting operation according to the amplified difference (K*δ), and then perform the adding operation by using the reference signal Vref_err, so as to provide the ramp signal Vnew_ramp.

Referring to a waveform relative position of FIG. 7, a peak Vnew_ramp_peak of the ramp signal Vnew_ramp is ahead of a peak Verr_peak of the error signal Verr, and the ramp signal Vnew_ramp is inverted to the error signal Verr.

Figure 2:
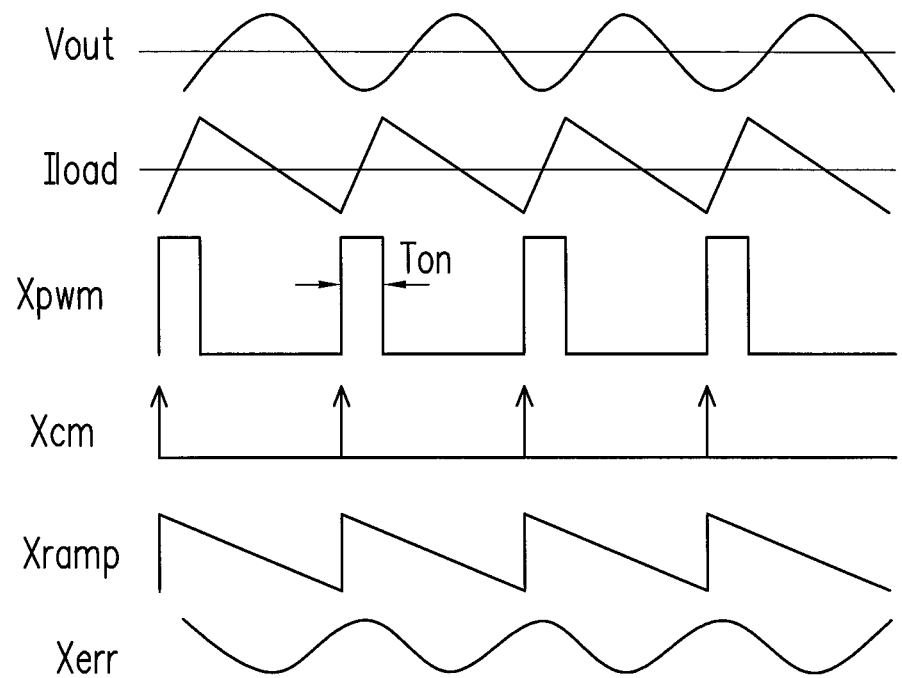
FIG. 2 is a waveform diagram of the conventional power converter.
Figure 4:
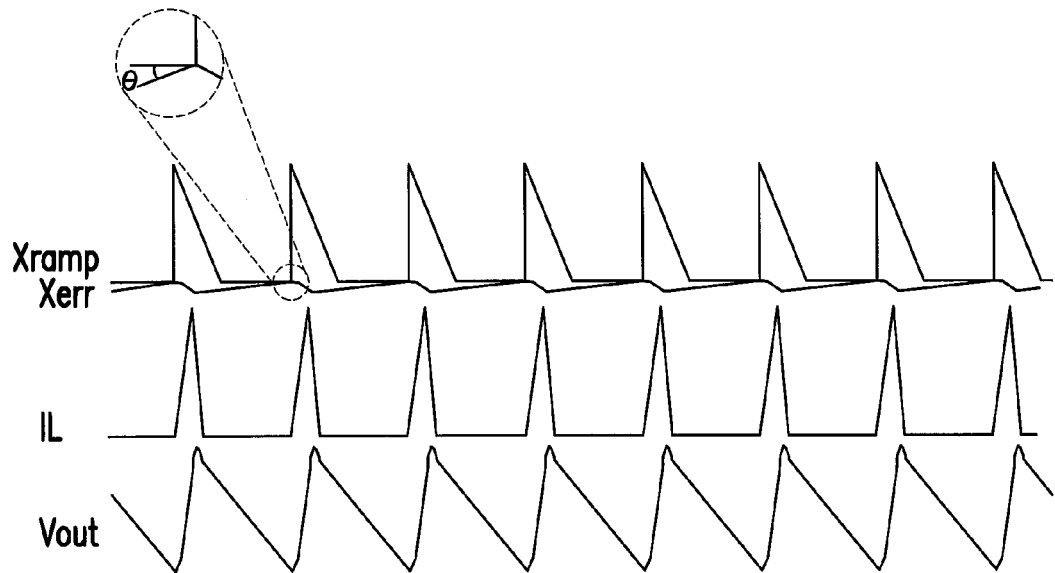
FIG. 4 is another waveform diagram of the conventional power converter.
Figure 8:
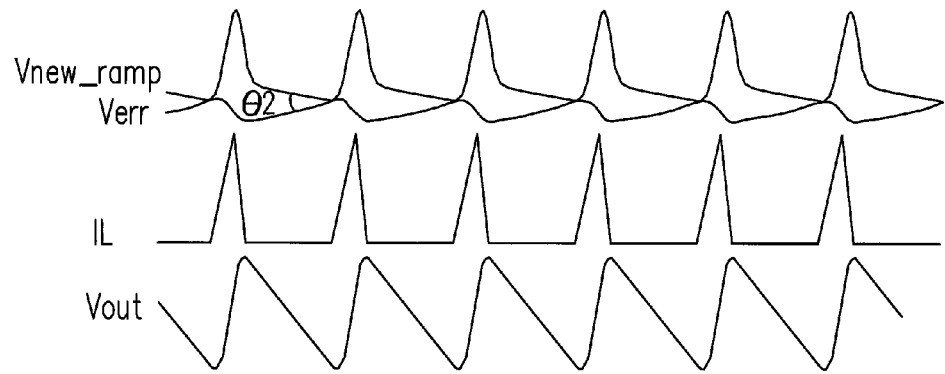
FIG. 8 is a waveform diagram of the power converter operated in a discontinuous conduction mode (DCM) according to an embodiment of the invention.

FIG. 8 is a waveform diagram of the power converter operated in a discontinuous conduction mode (DCM) according to an embodiment of the invention. Referring to FIG. 8, when an output load current belongs to a very light load, an operation frequency of an inductor current IL is decreased (i.e. a time of the operation period is prolonged). It should be noticed that the ramp signal Vnew_ramp is slowly decreased to be smaller than the error signal Verr along with variation of the error signal Verr, and then a pulse of an on time Ton shown in FIG. 2 is sent. In FIG. 8, an angle θ2 is formed between a climbing waveform of the error signal Verr and a slowly descending waveform of the ramp signal Vnew_ramp. The angle θ2 of FIG. 8 is greater than the angle θ of FIG. 4, so that in the discontinuous conduction mode, the anti-noise capability of the power converter of the invention is indeed improved.

Figure 9:
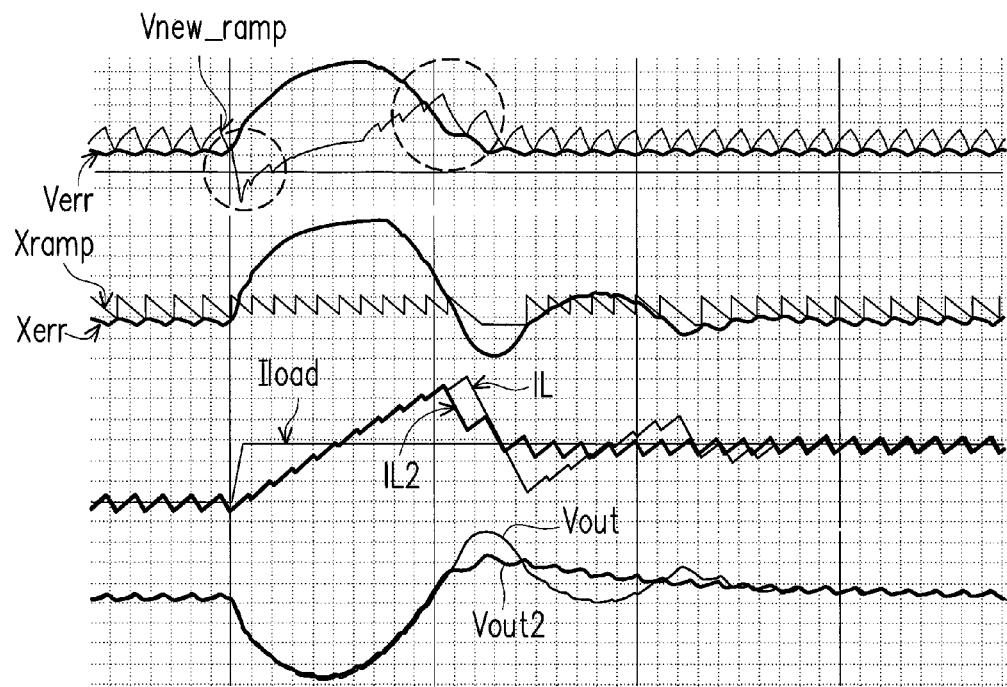
FIG. 9 is a waveform comparison diagram of the power converter of the invention and the conventional power converter.

FIG. 9 is a waveform comparison diagram of the power converter of the invention and the conventional power converter. Referring to FIG. 9, in the embodiment of the invention, the time point of the on time (Ton) is determined by comparing the ramp signal Vnew_ramp and the error signal Verr. Two dot line circles are illustrated, and the waveform encircled by the left dot line circle represents that a load voltage Iload is increased from the low level to the high level. The ramp signal Vnew_ramp in a transient state falls along with the error signal Verr to decide the time point of the on time in advance, or elevates to stop providing energy to the output voltage Vout2 in advance (referring to the output voltage Vout2 shown in FIG. 5).

Figure 3:
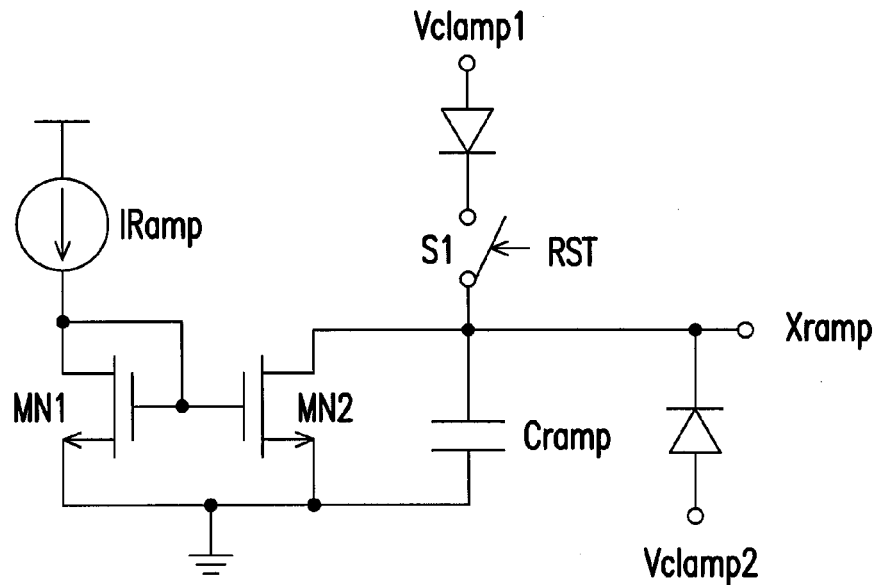
FIG. 3 is a circuit diagram of a conventional ramp generator.

In FIG. 9, the constant triangular wave of the conventional ramp signal Xramp is clamped between the first clamping voltage Vclamp1 and the second clamping voltage Vclamp2 shown in FIG. 3. When the error signal Xerr represents that the output voltage Vout (referring to Vout of FIG. 1) requires energy, the level of the error signal Xerr is greater than the level of the ramp signal Xramp, and the highest peak of the ramp signal Xramp is the first clamping voltage Vclamp1, and the conventional ramp generator 140 continually sends the pulses of the on time. When the error signal Xerr drops to be lower than the level of the ramp signal Xramp or more, the conventional ramp generator 140 has a chance to stop sending the pulses of the on time.

In FIG. 9, in the present embodiment of the invention, based on the approach that the ramp signal Vnew_ramp follows the error signal Verr, an inductor current IL2 or the output voltage Vout2 (referring to Vout2 shown in FIG. 5) may reach enough energy earlier. If the constant ramp signal Xramp is adopted, the inductor current IL2 or the output voltage Vout2 (referring to Vout shown in FIG. 1) may reach enough energy later. Therefore, compared to the embodiment of the invention, the conventional transient response speed is slower. The waveform of the inductor current IL2 of the embodiment of the invention has smaller oscillation compared to the waveform of the conventional inductor current IL. Similarly, the waveform of the output voltage Vout2 of the embodiment of the invention has smaller oscillation compared to the waveform of the conventional output voltage Vout. Therefore, during a loop control of the power converter, the ramp signal Vnew_ramp may improve converging the output voltage Vout2 of the power converter 500, so as to increase the transient response speed and provide better stability compared to that of the conventional technique.

Figure 10:
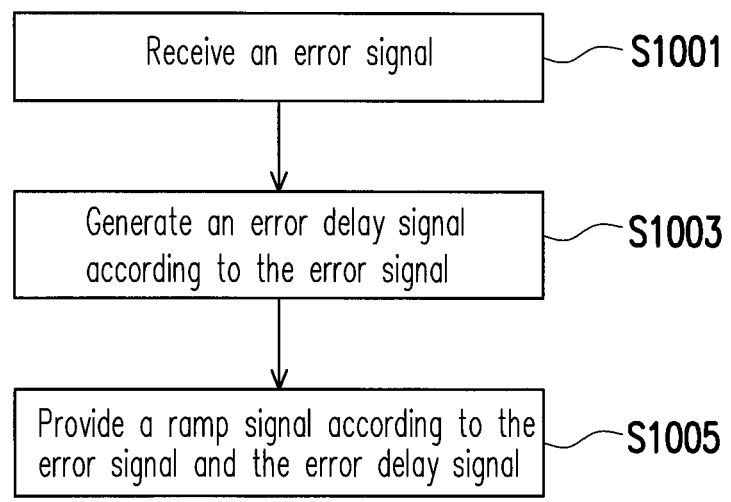
FIG. 10 is a flowchart illustrating a ramp signal generating method of a power converter according to an embodiment of the invention.

According to the above descriptions, a general ramp signal generating method of a power converter is deduced. In detail, FIG. 10 is a flowchart illustrating a ramp signal generating method of a power converter according to an embodiment of the invention. Referring to FIG. 5 and FIG. 10, the ramp signal generating method of the present embodiment includes following steps.

In step S1001, the error signal Verr is received. The error signal Verr relates to the output voltage Vout2 of the power converter 500.

In step S1003, the error delay signal Verr_delay is generated according to the error signal Verr.

In step S1005, the ramp signal Vnew_ramp is provided according to the error signal Verr and the error delay signal Verr_delay.

Further, in the step S1005, the difference δ can be generated according to the error signal Verr and the error delay signal Verr_delay, so as to provide the ramp signal Vnew_ramp according to the difference δ. Moreover, the ramp signal Vnew_ramp can be provided by multiplying the difference δ by the K-multiple amplification coefficient. In addition, referring to illustration and description of FIG. 7, the ramp signal Vnew_ramp is phase leading and inverting compared to the error signal Verr.

In summary, in the ramp signal generating method and the generator thereof and the PWM signal generator of the invention, the ramp signal is provided by using the error signal and the error delay signal. The novel ramp signal is used for replacing the conventional ramp signal. The ramp signal is phase leading and inverting compared to the error signal. In case of the loop control, the ramp signal and the error signal are used to decide a time point of the on time, so as to quickly converge the output voltage of the power converter, such that the output voltage is quickly returned to a stable state and the transient response speed is increased. Moreover, the architecture of the invention provides better anti-noise capability in the discontinuous conduction mode.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A pulse width modulation signal generator, adapted to a power converter, the pulse width modulation signal generator comprising:
    an error amplifier, receiving a feedback signal to generate an error signal;
    a ramp signal generator, coupled to the error amplifier, and receiving the error signal to generate an error delay signal, wherein the ramp signal generator comprises:
        a delay unit, comprising a resistor and a capacitor connected in series between the error signal and a reference voltage, and generating the error delay signal according to the error signal received from a first terminal of the resistor coupled to the error amplifier; and
        a conversion control device, comprising a first input terminal coupled to the first terminal of the resistor to receive the error signal and a second input terminal coupled to a command node of the resistor and the capacitor to receive the error delay signal, and outputting a ramp signal according to a difference of the error signal and the error delay signal;
    a comparator, connected to the error amplifier to receive the error signal and connected to the ramp signal generator to receive the ramp signal, and generating a trigger signal according to the ramp signal and the error signal; and
    a control circuit, generating a pulse width modulation signal according to the trigger signal.

2. The pulse width modulation signal generator as claimed in claim 1, wherein the conversion control device has a K-multiple amplification coefficient, and the conversion control device receives the difference of the error signal and the error delay signal, and multiplies the difference by the K-multiple amplification coefficient to provide the ramp signal.

3. The pulse width modulation signal generator as claimed in claim 1, wherein the ramp signal generator further comprises:
    an input unit, receiving the error signal, wherein the error signal relates to an output voltage of the power converter.

4. The pulse width modulation signal generator as claimed in claim 1, wherein the ramp signal is phase leading and inverting compared to the error signal.

* * * * *